Aug. 11, 1964  C. F. STRANDBERG, JR  3,144,029
AUTOMATIC GRAIN MOISTURE CONTROL
Filed Nov. 5, 1962
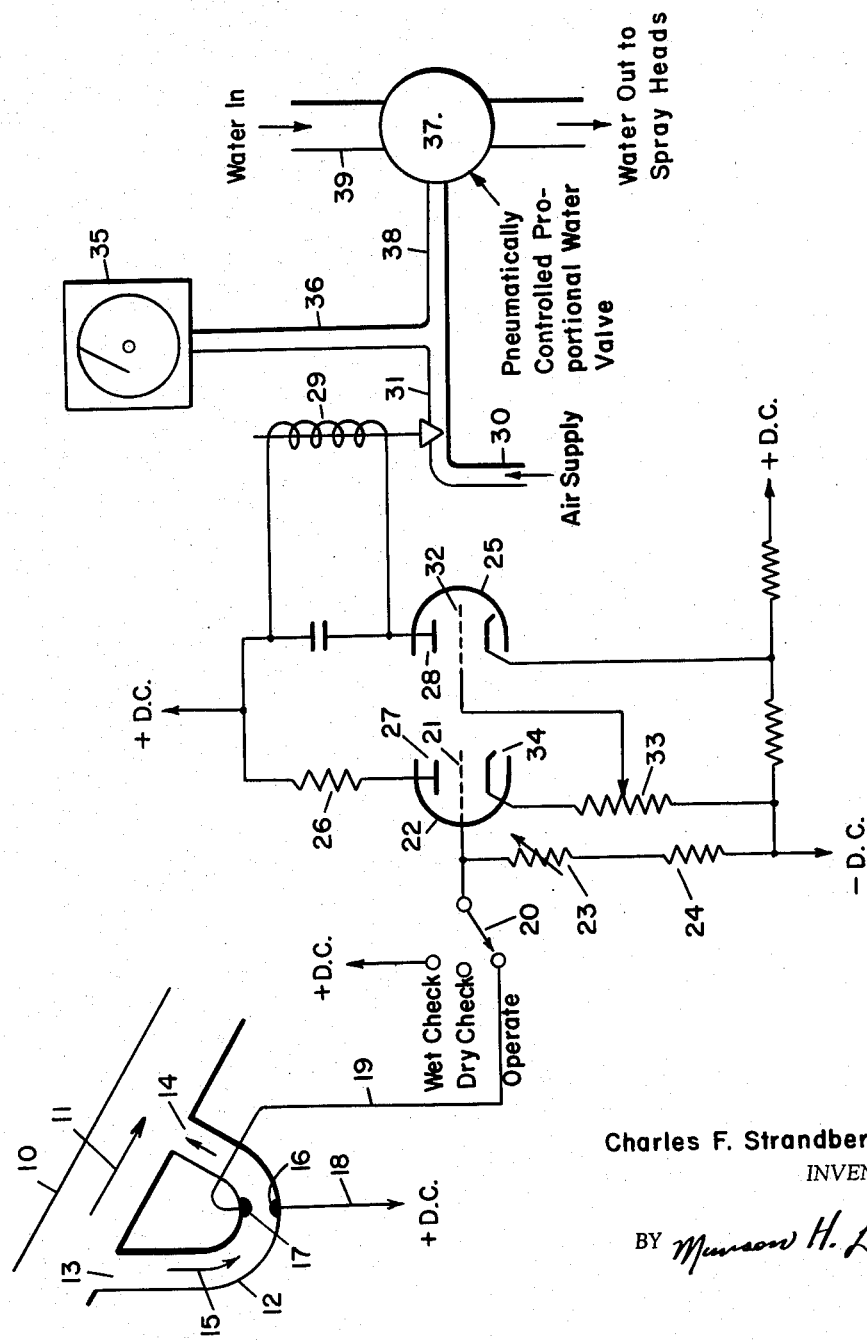
Charles F. Strandberg, Jr.
INVENTOR.
BY Munson H. Lane
Att'y.

United States Patent Office 3,144,029
Patented Aug. 11, 1964

3,144,029
AUTOMATIC GRAIN MOISTURE CONTROL
Charles F. Strandberg, Jr., Greensboro, N.C., assignor to Strandberg Engineering Laboratories, Inc., Greensboro, N.C., a corporation of North Carolina
Filed Nov. 5, 1962, Ser. No. 235,357
5 Claims. (Cl. 134—57)

This invention relates to new and useful improvements in apparatus for tempering grain, that is, apparatus for adding moisture to grain such as wheat, for example, prior to milling of flour.

It is customary in the art to spray dry wheat with water so that the moisture penetrates into the kernel. The damp wheat is fed into a conditioning chamber where it remains for several hours and during the conditioning interval, water on the surface of the kernels is absorbed, often with the aid of forced air currents. The tempered wheat is then cracked open by break rolls, flour, brain and shorts are separated, and each is processed further. The efficiency of separation influences the quality of the resultant products and is greatly affected by tempering or moisture content of the wheat. In accordance with conventional practice, samples of wheat were periodically taken and laboratory tested for content of moisture, and in view of the results of such tests, greater or lesser quantities of water were sprayed on the wheat by manipulation of a hand-controlled water valve. This conventional procedure presented many disadvantages in that the periodic sampling, apart from being time consuming, was not accurately representative of a continuous stream of grain. Moreover, the hand controlled feeding of water provided no assurance against over-watering or under-watering, unless additional sample testing was made after each change in the rate of water feed.

It is, therefore, the principle object of this invention to eliminate the difficulties above outlined, this object being attained by the provision of an apparatus for automatically and continuously controlling the tempering operation, so that proper moisture content of the grain is maintained at all times.

Briefly, the control apparatus in accordance with the invention comprises means for electrically sensing the moisture content of flowing grain, pneumatically actuated valve means for regulating the flow of water to the grain spraying heads, and means responsive to the electrical sensing means for regulating the pneumatic actuation of the valve means, whereby the quantity of water sprayed on the grain is continuously and accurately controlled in accordance with the moisture content of the grain itself. In addition, the apparatus includes means for continuously recording any variations in the tempering operation.

With the foregoing more important objects and features in view and such other objects and features as may become apparent as this specification proceeds, the invention will be understood from the following description taken in conjunction with the accompanying drawing, wherein:

The single figure is a diagrammatic illustration of the grain tempering control apparatus in accordance with the invention.

Referring now to the accompanying drawing in detail, the reference numeral 10 designates a conduit wherein dry wheat flows in the direction of the arrow 11. A gravity fed by-pass conduit 12 of a substantially U-shaped configuration communicates at its ends with the conduit 10, the latter being provided at longitudinally spaced points with openings 13, 14 so that a portion of the wheat stream flowing therethrough may be by-passed through the conduit 12, as indicated by the arrow 15.

A pair of mutually spaced probes or sensing elements in the form of electrical contacts 16, 17 are provided in the bight portion of the by-pass conduit 12, these contacts preferably being diametrically opposed as shown, so that the amount of wheat between the contacts and the entrance opening 13 of the by-pass conduit is constant and exerts a constant pressure against the contacts, regardless of the velocity and depth of wheat flowing through the main conduit 10. The by-pass conduit 12 is preferably made of transparent plastic material so as to facilitate visual checking of the flow of wheat therethrough, and also to electrically insulate the contacts 16, 17 from each other.

The proble or contact 16 is connected to the positive terminal of a suitable D.S. power supply as indicated at 18, while the proble or contact 17 is connected by a conductor 19 through a suitable test switch 20 to the grid 21 of a vacuum tube 22. The electrical resistance of the wheat between the probes 16, 17 is inversely related to the moisture content of the wheat and forms one leg of a voltage divider network, the other leg of which consists of a variable resistor 23 and a current limiting resistor 24. The voltage developed across the series combination consisting of the resistors 23, 24 is dependent upon the amount of current flowing through the voltage divider network. The greater the moisture content of the wheat, the lower is its electrical resistance and the greater is the current flow through the network. Thus, the voltage developed across the series combination of the resistors 23, 24 is directly related to the moisture content of the wheat. This voltage is amplified by the vacuum tube 22 which operates as a cathode follower, and by a vacuum tube 25 which operates as a power amplifier.

A load resistor 26 is connected to the plate 27 of the vacuum tube 22, while current from the plate 28 of the tube 25 flows through the coil 29 of a conventional electro-pneumatic transducer having an air input 30 and output 31. The transducer converts a variable direct current in the range of 0 to 5 milliamperes to a proportional change in air pressure over the range of 3 to 15 p.s.i. An air supply of 20 p.s.i is applied to the transducer input 30 and as the current in the coil 29 varies from 0 to 5 milliamperes, the air pressure at the transducer output 31 varies proportionately from 3 to 15 p.s.i.

The voltage applied to the grid 32 of the amplifier tube 25 is adjusted by means of a potentiometer 33 in the cathode circuit 34 of the cathode follower 22, so that the current in the transducer coil 29 will vary from 0 to 5 milliamperes, corresponding to resistance of the wheat changing from infinite to zero. Dry Check and Wet Check positions of the test swtch 20 are provided for making this adjustment.

The air signal from the transducer output 31 is applied to a suitable pneumatic recorder 35 through a conduit 36, and to a pneumatically controlled proportional water valve 37 through a conduit 38. The chart of the recorder is calibrated in percentage of moisture content and the variable resistor 23 is used to adjust the position of the pen on the chart to agree with the amount of moisture in the wheat, as determined by a laboratory test.

The valve 37 controls the rate of flow of water passing through a conduit 39 to the grain spraying heads. The valve 37 is closed when air pressure of 15 p.s.i. is applied thereto, which corresponds to a high moisture content in the wheat. Conversely, the valve is fully open under air pressure of 3 p.s.i., corresponding to a low moisture content in the wheat. The extent of opening of the valve is inversely proprotional to the moisture content of the wheat passing through the by-pass conduit 12, as will be clearly apparent.

It is to be noted that the water spray is applied to the wheat after a portion thereof has been exposed to moisture measurement and not before. In this manner it is possible to avoid inaccuracies of measurement on wet wheat in which the moisture is not evenly distributed immediately after the addition of water.

While in the foregoing there has been described and shown the preferred embodiment of the invention, various modifications may become apparent to those skilled in the art to which the invention relates. Accordingly, it is not desired to the limit the invention to this disclosure, and various modifications and equivalents may be resorted to, falling within the spirit and scope of the invention as claimed.

What is claimed as new is:

1. Automatic means for controlling the moisture content of grain, comprising means conducting a main stream of moving grain to a conditioning chamber, means diverting and conducting a secondary stream of moving grain from said main stream and subsequently returning said secondary stream to said main stream, a pair of spaced electrically insulated electrodes located in said secondary stream and adapted to be bridged by said moving stream of grain, resistance responsive means connected to said pair of spaced electrodes and operable to provide a voltage which varies with variation in the resistance of the grain bridging said pair of electrodes, a pneumatic supply source, a pneumatically controlled proportional water valve in a water supply line, conduit means connecting said pneumatic supply source to said valve, and pressure regulating means in said conduit means responsive to the voltage provided by said resistance responsive means for varying the pneumatic pressure supplied to said valve in direct proportion to said voltage, said water supply line being connected to supply water to said grain in said main stream at a position beyond that at which said secondary stream has been diverted therefrom, and said valve operating in response to said regulated pneumatic pressure to supply moisture to said grain in inverse proportion to said regulated pneumatic pressure.

2. Automatic means for controlling the moisture content of grain, comprising means conducting a main stream of moving grain to a conditioning chamber, means diverting and conducting a secondary stream of moving grain from said main stream and subsequently returning said secondary stream to said main stream, a pair of spaced electrically insulated electrodes located in said secondary stream and adapted to be bridged by said moving stream of grain, a source of potential and an impedance connected in series circuit to said pair of spaced electrodes, electronic cathode follower means connected across said impedance to provide a voltage which varies with variation in the resistance of the grain bridging said pair of electrodes, a pneumatic supply source, a pneumatically controlled proportional water valve in a water supply line, conduit means connecting said pneumatic supply source to said valve, and pressure regulating means in said conduit means responsive to the voltage provided by said cathode follower means for varying the pneumatic pressure supplied to said valve in direct proportion to said voltage, said water supply line being connected to supply water to said grain in said main stream at a position beyond that at which said secondary stream has been diverted therefrom, said valve operating in response to said regulated pneumatic pressure to supply moisture to said grain in inverse proportion to said regulated pneumatic pressure.

3. In an apparatus for automatically controlling the moisture content of grain, the combination of a conduit having a stream of grain flowing therethrough, a set of electrically insulated contacts provided in said conduit and adapted to be bridged by the grain therein, resistance responsive means in circuit with said contacts and operable to provide a voltage which varies with variation in the resistance of the grain bridging said contacts, a water supply conduit for supplying water to said stream of grain at a point spaced downstream from said set of electrically insulated contacts with respect to the direction of flow of said stream of grain, a pneumatically actuated proportional valve positioned in said water supply conduit for regulating flow of water to the grain, and means for regulating pneumatic pressure supplied to said valve, said last mentioned means being responsive to the voltage provided by said resistance responsive means.

4. In an apparatus for automatically controlling the moisture content of grain, the combination of a conduit having a stream of grain flowing therethrough, a set of electrically insulated contacts provided in said conduit and adapted to be bridged by the grain therein, a source of potential and an impedance connected in series to said contacts, electronic cathode follower means connected across said impedance to provide a voltage which varies with variation in the resistance of the grain bridging said contacts, a water supply conduit for supplying water to said stream of grain at a point spaced downstream from said set of electrically insulated contacts with respect to the direction of flow of said stream of grain, a pneumatically actuated proportional valve positioned in said water supply conduit for regulating flow of water to the grain, and means for regulating pneumatic pressure supplied to said valve, said last mentioned means being responsive to the voltage provided by said cathode follower.

5. Apparatus for tempering grain comprising means conducting a main stream of moving grain to a conditioning chamber, means diverting and conducting a secondary stream of moving grain from said mean stream and subsequently returning said secondary stream to said main stream, a set of electrically insulated contacts provided in said secondary stream and adapted to be bridged by the grain therein, resistance responsive means in circuit with said contacts and operable to provide a voltage which varies with variation in the resistance of the grain bridging said contacts, and automatic means responsive to said voltage provided by said resistance responsive means to add a regulated quantity of water to said grain in said main stream at a position beyond that at which said secondary stream has been diverted therefrom in proportion to the variation of the electrical resistivity of said grain.

References Cited in the file of this patent

UNITED STATES PATENTS

| | | |
|---|---|---|
| 465,212 | Schilling | Dec. 15, 1891 |
| 2,016,920 | Fisher | Oct. 8, 1935 |
| 2,508,540 | Riggen | May 23, 1950 |
| 2,612,906 | Shafer | Oct. 7, 1952 |
| 2,694,544 | Hall | Nov. 16, 1954 |